United States Patent [19]

Mordstein et al.

[11] Patent Number: 4,593,863
[45] Date of Patent: Jun. 10, 1986

[54] DEVICE FOR CHOPPING UP GARDEN WASTE AND THE LIKE

[75] Inventors: Johann Mordstein, Deuringen; Erwin Karg, Neusäss, both of Fed. Rep. of Germany

[73] Assignee: Leonhard Schmid KG, Fed. Rep. of Germany

[21] Appl. No.: 622,359

[22] Filed: Jun. 20, 1984

[30] Foreign Application Priority Data

Jul. 6, 1983 [DE] Fed. Rep. of Germany ....... 3324274

[51] Int. Cl.⁴ ............................................. B02C 18/10
[52] U.S. Cl. ................................... 241/92; 241/101.7
[58] Field of Search .................. 241/101.7, 92, 100, 241/285 R, 282.1, 282.2, 99

[56] References Cited

U.S. PATENT DOCUMENTS

| | | | |
|---|---|---|---|
| 1,218,079 | 3/1917 | Gouinlock | 241/92 |
| 3,085,607 | 4/1963 | Schottle | 241/92 |
| 3,412,770 | 11/1968 | Johnson | 241/101.7 X |
| 3,716,089 | 2/1973 | Bateman | 241/101.7 X |
| 4,187,770 | 2/1980 | Coffield | 241/92 X |
| 4,477,029 | 10/1984 | Green | 241/101.7 |

FOREIGN PATENT DOCUMENTS

| | | |
|---|---|---|
| 2507083 | 6/1976 | Fed. Rep. of Germany ... 241/101.7 |
| 2908518 | 9/1980 | Fed. Rep. of Germany ... 241/101.7 |
| 3118518 | 11/1982 | Fed. Rep. of Germany ... 241/101.7 |

*Primary Examiner*—Mark Rosenbaum
*Attorney, Agent, or Firm*—Jones, Tullar & Cooper

[57] ABSTRACT

A device for chopping up refuse comprises a generally uncovered, level base plate, legs fixed at top ends thereof to the base plate, and a support disk adapted to turn about an upright axis. This disk is placed under the base plate and has at least one slot therein. A knife is fixed on the disk and placed to the back of the slot in the direction of turning of the disk, the knife having a cutting edge placed at a higher level than the top face of the disk. There is furthermore an electric motor with a drive shaft for driving the disk. The base plate functions as a support frame for the device. A filling passageway is supported on top of the base plate next to the motor that is also supported on the plate, and there is furthermore an upright and downwardly open ejection passageway fixed on a lower side of the base plate and coaxially placed around disk, that is fixed on the motor drive shaft.

5 Claims, 2 Drawing Figures

U.S. Patent  Jun. 10, 1986  4,593,863
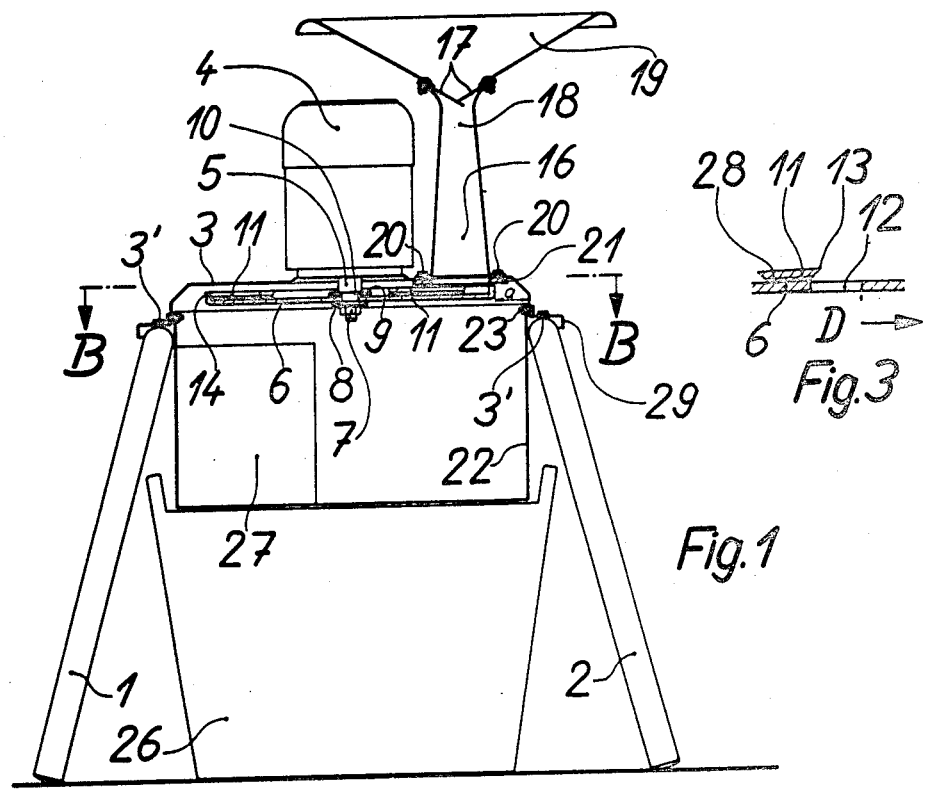
Fig.1
Fig.3
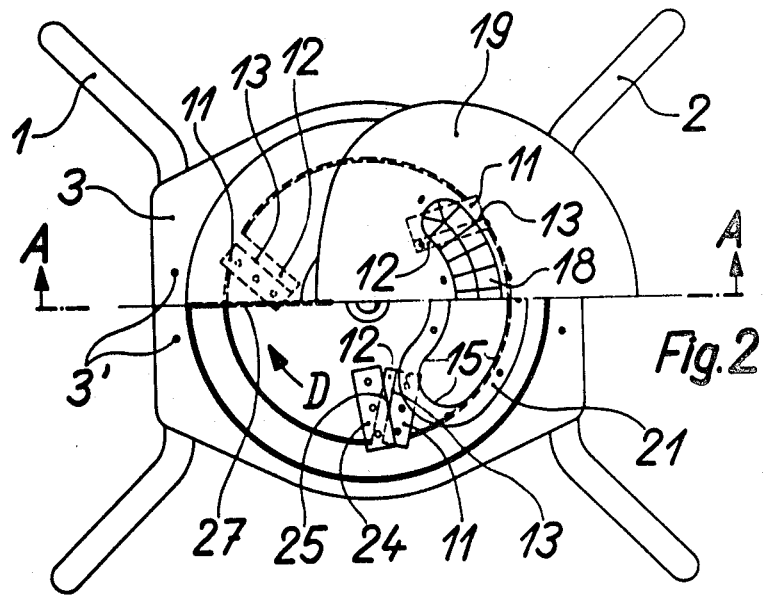
Fig.2

DEVICE FOR CHOPPING UP GARDEN WASTE AND THE LIKE

BACKGROUND OF THE INVENTION

The present invention relates to devices for the chopping up of garden litter and the like that is more specially of soft consistency. In particular, such a device may have a rotating support disk having at least one cutting knife so mounted thereon that the knife is right next to a slot in the disk with a lengthways cutting edge of the knife at a higher level than the top face of the support disk. The device is further fitted with a litter container for feeding litter to the cutting knife, a hopper for filling the container and legs so that the device may be stood upright on the ground.

DISCUSSION OF THE PRIOR ART

In the case of one known device designed on these lines the cutting unit is run at a high speed of about 3000 rpm so that the device is well suited for cutting up or chopping hard waste products such as branches. For use on soft garden trash such as fallen leaves, the device may be fitted with cutting wings on the disk sticking out quite some distance into the container so that the trash undergoes two stages of cutting: a first stage under the effect of the wings, and a second stage caused by the knife. There is however a shortcoming in this respect that the soft material is beaten up or mushed rather than being cleanly cut so that a liquid pulp is formed which is then likely to ferment and this is undesired. A further drawback is that stringy or fibrous rubbish is prone to catch on the wings and then adhere thereto so that the rate of flow of material through the device will be choked back, more specially insasfar as material is guided along an angled path between the supply container and the outlet.

SUMMARY OF THE INVENTION

For this reason one object of the invention is to put an end to these shortcomings in known garden trash choppers.

A further object of the invention is to so improve the design that, while keeping the useful effects of such a prior art chopper, the chopper in its enhanced form may readily be used for cutting up soft garden waste.

In this connection a still further aim of the invention is to design a chopper for garden litter which has a very short passageway for the litter through device.

In keeping with a further part of the invention a chopper of the sort in question is to be so organized that the passageway is more or less straight.

For effecting these and further purposes of the invention a chopper for garden trash has a level, uncovered base plate, which is possibly fitted with a skirt dependent from its edge for reinforcing it, covers the knife disk and is fixed on the legs, such base plate further functioning as a support for an upright supply passage and the electric driving motor side by side, while on the lower side of the base plate an upright downwardly opening outlet passageway is fixed, that is coaxially placed around the knife disk mounted on the motor drive shaft.

In the invention there is no need for any housing for the chopping space or for any angled outlet means leading into a separate ejection duct. In the device of the invention the chopping action takes place only between the base plate and the knife support disk. The material to be chopped up comes out of the opening of the filling hopper directly into the cutting path of the lengthways cutting edge of the knife. Once chopped, the material may then fall out through the slots in the support disk without anything more in its way. The length of the passage of the material through the device is as short as possible. The frame of the device, on which all parts are mounted, is only made up of the uncovered base plate. On its lower face the base plate only has a downwardly opening passageway so that the chopped material may make its way out downwards into a container placed under the device.

In keeping with a further outgrowth of the present invention the ejection passageway is placed around the support disk with a clearance that is large enough to stop the device from becoming clogged up. Even if pieces of material are slung off the suppprt disk, the design measures noted so far will make certain that there is no danger of the device blocking up.

Such flinging of material out from the disk may furthermore be stopped by having a rim running upwards from the edge of the disk.

As part of a further development of the invention the lengthways cutting edge of the knife is at such an angle to a radial line that it runs towards the outer edge of the disk in the direction of turning. In this case the crossover point between the lengthways cutting edge of the knife and the counter-knife formed by the opening of the filling hopper or fixed thereto moves inwards and counteracts the centrifugal effect. This is furthermore helpful in making certain of the cleanest possible cutting action.

For perfecting the chopping action and making certain that it is as complete as possible, it is possible to have one or more secondary cutting knives placed after the filling hopper in the direction of rotation, such knives being preferably so placed that their lengthways cutting edges are radial with respect to the axis of turning.

It is convenient if the cross section of the filling hopper becomes wider under its throat towards its outlet opening. This helps along the motion of material through the device in connection with the expansion or spreading out of the material, a further effect promoting flow in this respect being the suction effect of the cutting unit due to the high speed of turning thereof.

Further details and useful effects of the invention will be seen from the account now to be given using the figures herein.

BRIEF DESCRIPTION OF THE DRAWING

FIG. 1 is a side view and section as taken on the lengthways median section line A—A of FIG. 2.

FIG. 2 is a plan view and section taken on the line B—B of FIG. 1.

FIG. 3 is a view of part of the device on a larger scale.

DETAILED DESCRIPTION OF A PREFERRED EMBODIMENT

Turning to the figures it will be seen that a base plate 3 is fixed and supported on the legs 1 and 2. The legs are formed by the two limbs of each of two U-like parts that are fixed to the base plate by screws 3'. Supported at the middle of the base plate 3 is an electric motor 4, that is fitted with a quick-stop brake so that, for reasons of safety, the motor is braked and halted as soon as its current supply is turned off. A support disk or impeller 6 is fixed on the motor drive shaft 5 by way of a nut 7, a loading washer 8 and a shim 9 that is forced against a shoulder or collar 10 on the drive shaft 5. Different sizes of shim may be used to get accurate adjustment of the height of the disk 6. Three identical knives 11 are fixed on the impeller 6 so that each of them is to the back (in the direction of rotation D) of a slot 12. The cutting edge 13 of each knife 11 is placed at such an angle to a radial line that it runs towards the outer edge of the impeller in the direction D of turning, that is to say so that its outer end is further forward than its inner end. On the edge of the disk there is an upwardly turned rim 14.

Over the impeller 6 there is an upright hopper 16 that has a lower outlet 15 with an outline as viewed in FIG. 2. The outlet 15 opens directly over the plane of turning of the knives 11. The hopper 16 has a throat 18 where its cross section is at a minimum and which is covered over by two rubber lips 17. From the throat 18 to the lower end of the hopper the cross section increases. The top part of the hopper has the typical funnel-like form of a hopper at 19, whereas the lower part is to be thought of as the stem of the hopper. The outlet 15 with the special form to be seen in FIG. 2 is part of a replaceable cutting frame 21 that is fixed by screws 20 on the base plate 3. This cutting frame 21 may be looked on as a counter-knife frame for functioning with the knives 11 moving in relation thereto. The cutting gap therebetween may be set by using shims 9 to be in line with the sort of rubbish that is to be chopped up. Adjustment is for example even possible to cut up prunings, but then the diameter of the wood able to be cut will be limited by the rating of the motor 4.

An ejection passageway 22 is screwed at 23 onto a downwardly angled edge skirt 29 on the base plate 3 and is placed round the impeller 6 with a clearance sufficient to act as a safeguard against jamming. As seen in the direction D of rotating the opening 15 of the hopper is placed a small distance short of a secondary knife 24 with a cutting edge 25 running in the radial direction. This secondary knife is designed for causing further chopping of the material after cutting by the knives 11 so that any fibrous structures not so far sufficiently comminuted by the knives 11 will be cut by these further knives.

Under the ejection passageway 22 there is a take-up and transport container 29. There is a sheet metal baffle 26 for checking swirling motion of the air in the ejection passageway 22 that might otherwise be caused by the high speed of the impeller 6. On the other hand the motion of the air produced may be made good use of for producing a vacuum at the opening of the hopper 16 so that the speed of material therethrough is stepped up. This is furthermore the purpose of its widening form under its narrowest part or throat 18. There is a knife support or base material 28 to economize in the use of expensive knife material.

We claim:
1. A device for chopping up refuse, comprising:
   a generally uncovered, level base plate, said base plate having a downwardly formed skirt thereon for reinforcing it;
   a pair of spaced apart legs, each leg having a top end to which one side of the base plate is fixed, said base plate assuming its level orientation when fixed to said legs;
   an electric motor mounted to said base plate, said electric motor having a drive shaft extending therefrom said drive shaft defining a drive axis;
   a support disk supported on said drive shaft for rotation therewith and about said drive axis, said support disk being disposed under said base plate and having a top face and at least one slot formed therein;
   at least one knife fixed on said support disk and situated at the back side of said at least one slot viewed in the direction of rotation of said support disk, said knife having a cutting edge situated at a higher level than the top face of said support disk;
   means defining a filling passageway, said means being supported on said base plate adjacent to said electric motor and serving as a counter-knife frame for functioning with said at least one knife moving in relation thereto;
   further means defining an upright and downwardly open ejection passageway, said further means being fixed on a lower side of said base plate and situated coaxially around said support disk such that said ejection passageway is placed around said support disk with a clearance therebetween sufficient to guard against stoppage of said device; and
   a rim running upwards from an outer edge of said support disk.
2. The refuse chopping device as claimed in claim 1 wherein the cutting edge of said knife is placed at such an angle to a radial line running out from the drive axis that an outer end of said cutting edge is ahead of an inner end thereof in the direction of rotation.
3. The refuse chopping device as claimed in claim 1 comprising at least one secondary knife placed a short distance after an opening of the filling passageway in the direction of rotation of said disk.
4. The refuse chopping device as claimed in claim 3 wherein said at least one secondary knife is placed so that a cutting edge thereof is radial with respect to a line that is radial in relation to the drive axis.
5. The refuse chopping device as claimed in claim 1 wherein said filling passageway has a throat and widens in cross section downwards therefrom.

* * * * *